United States Patent
Notohamiprodjo et al.

(10) Patent No.: US 7,733,678 B1
(45) Date of Patent: Jun. 8, 2010

(54) POWER FACTOR CORRECTION BOOST CONVERTER WITH CONTINUOUS, DISCONTINUOUS, OR CRITICAL MODE SELECTION

(75) Inventors: Hubertus Notohamiprodjo, Union City, CA (US); Jianqing Lin, Pleasanton, CA (US)

(73) Assignee: Marvell International Ltd., Hamilton (BM)

( * ) Notice: Subject to any disclaimer, the term of this patent is extended or adjusted under 35 U.S.C. 154(b) by 469 days.

(21) Appl. No.: 11/849,158

(22) Filed: Aug. 31, 2007

Related U.S. Application Data

(63) Continuation-in-part of application No. 10/804,660, filed on Mar. 19, 2004, now Pat. No. 7,266,001.

(51) Int. Cl.
*G05F 1/70* (2006.01)

(52) U.S. Cl. .......................... 363/89; 363/49; 323/222; 323/901

(58) Field of Classification Search ................. 323/222, 323/283, 901; 363/49, 89
See application file for complete search history.

(56) References Cited

U.S. PATENT DOCUMENTS

| | | | | |
|---|---|---|---|---|
| 5,408,403 | A * | 4/1995 | Nerone et al. ................. | 363/37 |
| 5,742,151 | A * | 4/1998 | Hwang ........................ | 323/222 |
| 5,757,635 | A | 5/1998 | Seong | |
| 5,804,950 | A * | 9/1998 | Hwang et al. ................ | 323/222 |
| 5,905,369 | A | 5/1999 | Ishii et al. | |
| 6,043,633 | A | 3/2000 | Lev et al. | |
| 6,282,109 | B1 * | 8/2001 | Fraidlin et al. ................ | 363/89 |
| 6,344,986 | B1 * | 2/2002 | Jain et al. ..................... | 363/89 |
| 6,469,917 | B1 * | 10/2002 | Ben-Yaakov .................. | 363/44 |
| 6,504,132 | B1 * | 1/2003 | Church ....................... | 219/130.1 |
| 6,556,462 | B1 * | 4/2003 | Steigerwald et al. .......... | 363/89 |
| 6,831,449 | B2 | 12/2004 | Nishida et al. | |
| 6,912,142 | B2 * | 6/2005 | Keim et al. .................... | 363/89 |
| 7,266,001 | B1 * | 9/2007 | Notohamiprodjo et al. .... | 363/59 |
| 7,391,631 | B2 * | 6/2008 | Shimada ....................... | 363/89 |
| 7,417,879 | B2 * | 8/2008 | Sawtell ........................ | 363/89 |
| 2002/0089866 | A1 * | 7/2002 | Keim et al. ................... | 363/89 |
| 2004/0047166 | A1 * | 3/2004 | Lopez-Santillana et al. ... | 363/89 |
| 2007/0058402 | A1 * | 3/2007 | Shekhawat et al. ........... | 363/89 |
| 2008/0084721 | A1 * | 4/2008 | Miramonti et al. ............ | 363/89 |

OTHER PUBLICATIONS http://www.iwatt.com/technology/index.htm, 2 pages, Aug. 20, 2003.

Bindra, Ashok, "Power Supply Controller Keeps Efficiency High Across All Loads," Electronic Design, Dec. 3, 2001, Cover Story.

* cited by examiner

*Primary Examiner*—Jeffrey L Sterrett

(57) ABSTRACT

In a method and apparatus for controlling power factor correction in mixed operation modes, a frequency of the input voltage is obtained by detecting the zero crossing points of the input voltage. A peak of the input voltage is obtained by detecting input voltage with 90 degree phase. Thus, the present invention predicts the input voltage by its frequency and peak and the characteristic of the sine wave. A digital signal processor computes the duty and frequency of a boost switch, switching the operation mode of the boost converter among continuous mode, critical mode and discontinuous mode according to input voltage or the load. According to another aspect, the operation is switched to critical mode from the average current mode when a zero current is detected before the charging and recharging cycle of the boost switch is finished. Overcurrent protection may be achieved by controlling current in response to detected voltage to provide a substantially constant power level. The overcurrent protection may be adaptive in nature.

23 Claims, 14 Drawing Sheets

POWER FACTOR CORRECTION BOOST CONVERTER WITH CONTINUOUS, DISCONTINUOUS, OR CRITICAL MODE SELECTION

CROSS-REFERENCE TO RELATED APPLICATION

This application is a continuation-in-part of U.S. application Ser. No. 10/804,660, filed Mar. 19, 2004. The contents of that parent application are incorporated by reference herein.

BACKGROUND OF THE INVENTION

1. Field of the Invention

The present invention relates to power factor corrections, and more specifically to multiple mode power factor correction.

2. Description of the Related Art

An electrical load may appear to a power supply as a resistive impedance, a capacitive impedance, an inductive impedance, or a combination thereof. When the current is in phase with or at least very close to being in phase with the voltage, the power factor is said to be good. When an electrical load is purely resistive, the current passing to the load is proportional to the voltage crossing the load. The power factor of such an electrical load is close to one. The power factor is less than one in all other situations. If an electrical load is not purely resistive, it introduces noise into the power line. To reduce the noise to the power line caused by electrical loads, nowadays, power supplies with an electrical power output above 30 watts are required to have power factor corrections, so as to shape the input current waveform to follow the input voltage waveform.

Boost converters are used for power factor correction. FIG. 1 shows a block diagram of one example of a boost converter. A capacitor 101 filters input current ripple. A four-way rectifier 102 rectifies an input voltage $V_{in}$. When a boost switch 103 is closed, an operating cycle starts. The power source $V_{in}$ charges a boost inductor 104 via an input current $I_{in}$, and energy is stored in the boost inductor 104. When $I_{in}$ reaches a value determined by a controller 105, the controller 105 outputs a signal to open the boost switch 103, and the inductor 104 discharges via a load 106. When the boost switch 103 has been opened for a period of time determined by the controller 105, or the input current $I_{in}$ falls to a value determined by the controller 105, the controller 105 outputs a signal to close the boost switch 103, and the next operation cycle starts. A boost diode 107 prevents current from flowing back to the boost inductor 104 from the load 106. A capacitor 108 filters high frequency noises of the rectified $V_{in}$ and a capacitor 109 removes ripples in the output voltage $V_{out}$.

Conventional boost converters use one of three operation modes: continuous mode (also called average current mode), discontinuous mode, or critical mode, but cannot switch among them.

FIG. 2A shows a block diagram of a conventional power factor correction controller for the continuous mode. A power factor correction controller has two tasks. The first is to regulate the output voltage $V_{out}$ to keep it stable. The second is to regulate the input current $I_{in}$ to make it follow the waveform of the input voltage $V_{in}$, mimicking that the load is purely resistive. As shown, a subtractor 201 subtracts a reference voltage $V_{ref}$ from the output voltage $V_{out}$ to obtain a voltage error $V_{err}$, which is then amplified by a voltage amplifier 202. The subtractor 201 and the voltage amplifier 202 are used to regulate $V_{out}$ to keep the output stable.

The input voltage is a sine wave. To make a load appear as a purely resistive load, the input current needs to be regulated as a sine wave in the same phase as the input voltage. A multiplier 203 multiplies the amplified $V_{err}$ from the voltage amplifier 202; the rectified input voltage $V_{inrec}$; and the normalized root mean square value of the rectified input voltage $V_{inrec}$ from a low pass filter 204 and a normalizer 205. The output of the multiplier 203 is a factor $C_{ref}$. A subtractor 206 subtracts the factor $C_{ref}$ from the input current of the boost converter, obtaining a current error $C_{err}$, which is amplified by an amplifier 207 and is then used to control a pulse width modulator (PWM) 208.

The period, $T_s$, of the charging and discharging cycle in the continuous mode is fixed. The charging time is determined by the amplified current error $C_{eaout}$. Thus, the discharging time is $T_s$ minus the charging time. The resulting switch voltage $V_{sw}$ is then used to control the boost switch 103 shown in FIG. 1.

FIG. 2B illustrates the voltage waveform and current waveform of a conventional boost converter in continuous mode. The current in continuous mode never goes to zero, except at the edges. The benefit of running continuous mode is lower ripple current, so that the controller only needs a small input filter. However, at a given power level, if the continuous mode is used, the size of the inductor must be large in the full cycle.

FIG. 3A shows a block diagram of a conventional power factor correction controller for the critical mode. Similarly to the power factor correction controller shown in FIG. 2A, the power factor correction controller for the critical mode obtains an amplified voltage error by a subtractor 301 and a voltage amplifier 302. A zero current detector 303 finds zero current points in the input current $I_{in}$. A PWM 308 is coupled to the outputs of the voltage amplifier 302 and the zero current detector 303. In the critical mode, the charging time is fixed and is determined by the voltage amplifier 302, and the boost inductor 104 keeps discharging until a zero current point is met.

FIG. 3B illustrates the voltage waveform and current waveform of a conventional boost converter for the critical mode. As shown, the boost inductor keeps discharging until a zero current point is met. When the critical mode is used, the size of the inductor can be small, but the ripple current is very high, thus requiring a large input filter.

FIG. 4 illustrates the voltage waveform and current waveform of a conventional boost converter in discontinuous mode. As shown, the input current $I_{in}$ remains off for a certain time interval between each charging and discharging cycle. The discontinuous mode also has high ripple current and needs a large input filter.

Another disadvantage of conventional boost converters is that their current harmonic distortions start to increase when the load is lowered.

A further disadvantage of the conventional boost converters is that their responses in certain frequency bands are very slow. If they respond too fast, there will be large spikes.

Therefore, it would be advantageous to provide a method and apparatus for controlling the boost converters in multiple modes during power factor correction, so as to keep both the boost inductor and the input filter small.

SUMMARY OF THE INVENTION

In view of the foregoing, it is an object of the present invention to provide a power factor correction controller, which dynamically changes operation mode of a boost converter during a half cycle of the voltage, thus gaining the benefit of small size inductor, low harmonic distortion, and small ripple current. A digital signal processor calculates the duty cycle and frequency of the boost switch. In one embodiment, when the phase of the voltage is roughly between 45 degrees and 135 degrees, the voltage is high, and the controller forces the boost converter to operate in continuous mode by adjusting the frequency and duty cycle of the boost switch. Beyond this range, the controller forces the boost converter to operate in critical or discontinuous mode.

It is another object of the present invention to provide a controller for power factor correction for a variable load. The controller senses the input current continuously and switches the operation mode automatically according to the load to improve the response. The operation is in continuous mode when the load is high, and in the critical mode when the load is reduced.

It is another object of the present invention to provide a controller for power factor correction, which switches operation mode from average current mode to critical mode when a zero current is detected before the charging and discharging cycle is finished.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

Objects and advantages of the present invention will become apparent from the following detailed description.

Figure 1:
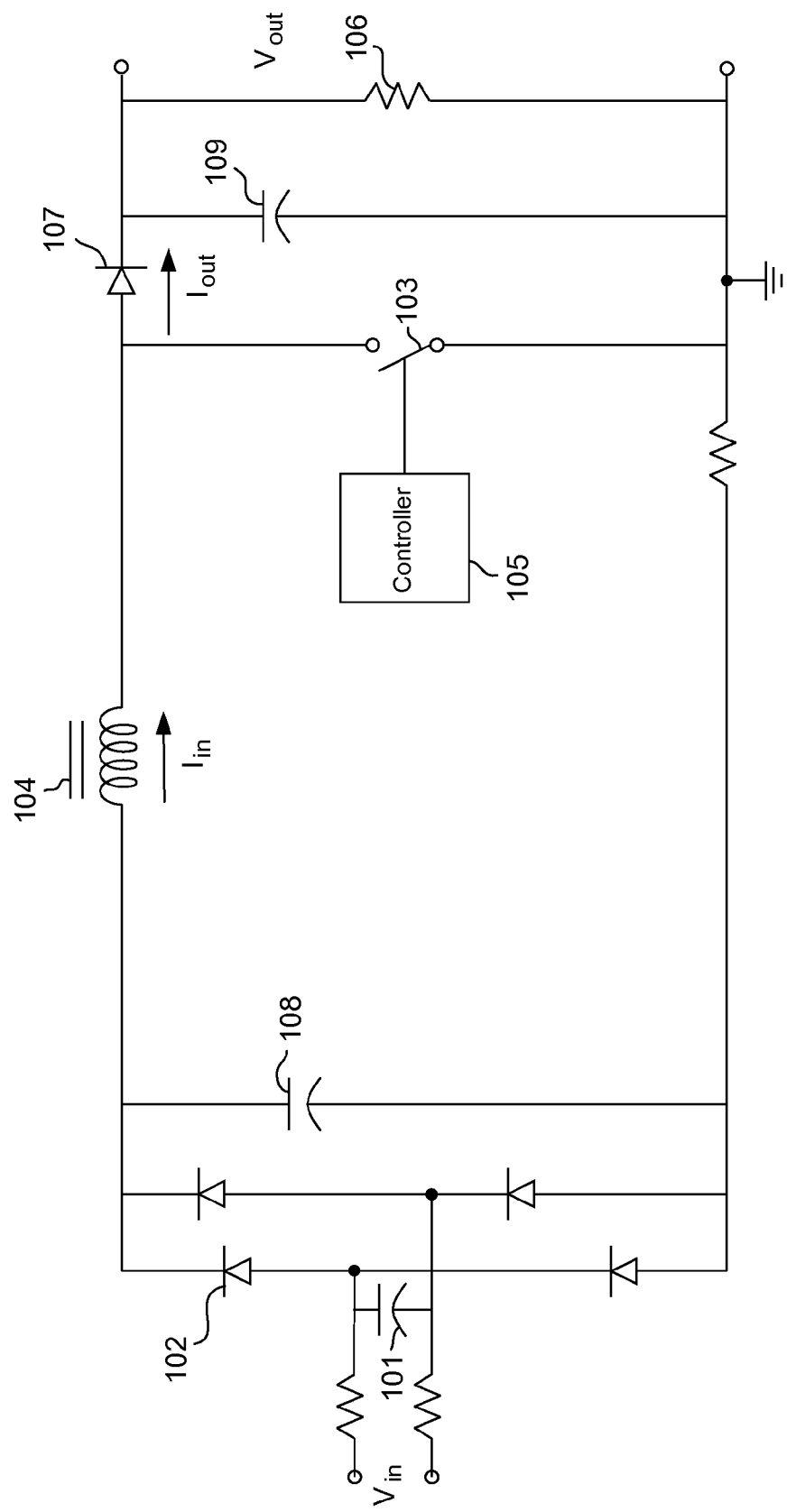
FIG. 1 shows a block diagram of one example of a boost converter.
Figure 5A:
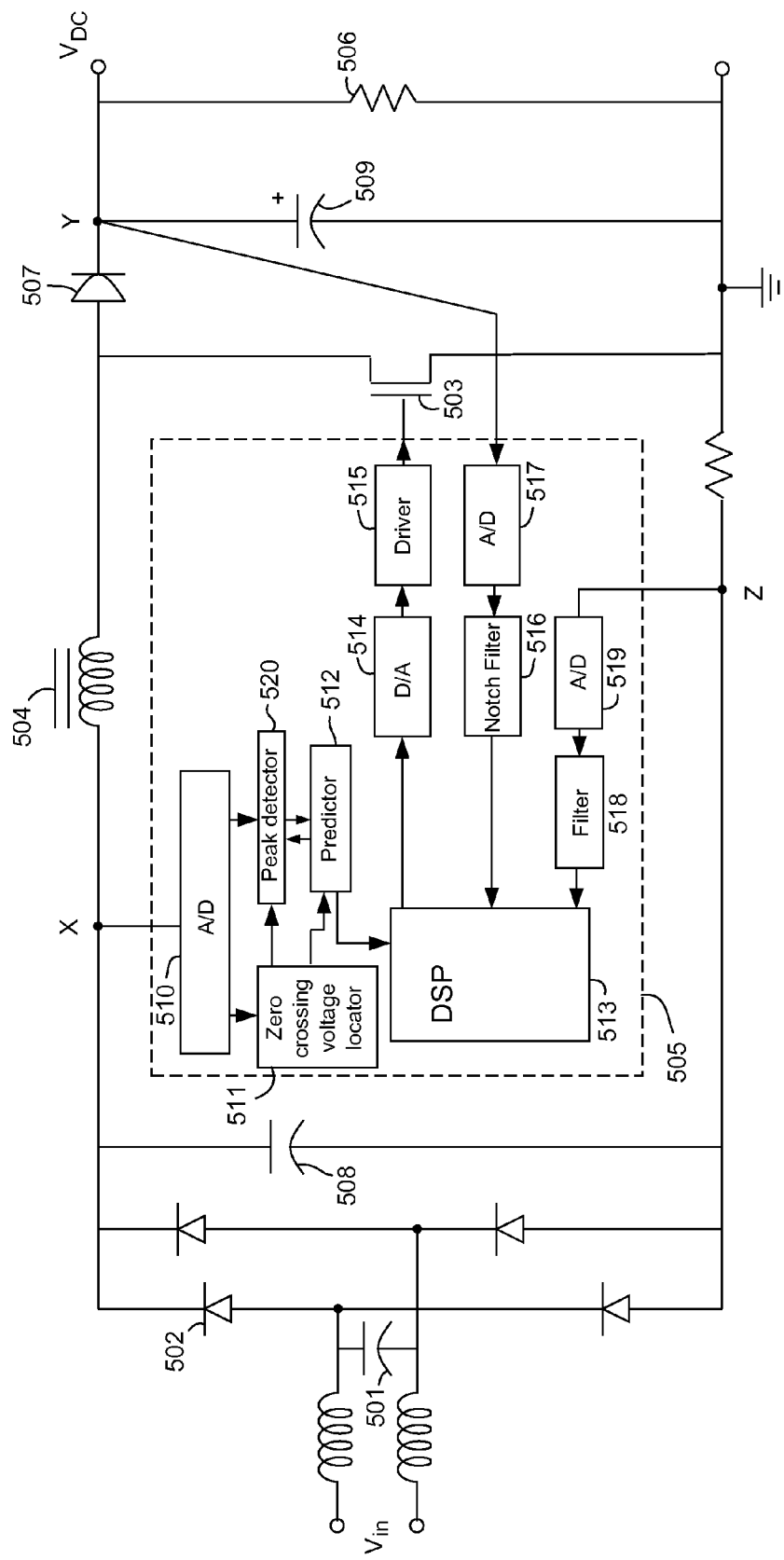
FIG. 5A shows a block diagram of an apparatus for power factor correction, employing a multiple mode controller according to one embodiment of the present invention.

FIG. 5A shows a block diagram of an apparatus for power factor correction, employing a multiple mode controller according to one embodiment of the present invention. The controller 505 shown in FIG. 5A can dynamically switch the operation mode of the boost converter among continuous mode, critical mode, and discontinuous mode. The controller 505 is a DSP (Digital Signal Processor). In one embodiment, the controller 505 is an ASIC (Application Specific Integrated Circuit). Other embodiments for controller 505, including microprocessors and other hardware/software/firmware implementation will be apparent to ordinarily skilled artisans. Other parts of the boost converter shown in FIG. 5A are similar to those shown in FIG. 1.

As shown, the controller 505 obtains inputs at points X, Y, and Z. The controller 505 senses a zero crossing voltage at point X; senses a voltage at point Y to maintain the output voltage stable; and senses the current at point Z to predict the load behavior.

The sensed voltage signals at point X are converted to digital signals by an A/D converter 510. A zero crossing voltage locator 511 finds out zero crossing voltages, and output them to a predictor 512 and a peak detector 520. The predictor 512 determines the frequency of the input voltage and the locations of the point with 90 degree phase. A peak detector 520 obtains the voltage magnitude of this point, the peak voltage, and sends the peak voltage to the predictor 512.

In one embodiment, the predictor 512 has a predictive look up table. One form of the predictive look up table, in which D represents duty cycle, is as follows.

| Frequency | Vin | Equations |
|---|---|---|
| 50 Hz | 220 V | $D = 1 - \dfrac{220 \sin\theta}{V_{out}}$ |
| 50 Hz | 230 V | $D = 1 - \dfrac{230 \sin\theta}{V_{out}}$ |
| 50 Hz | 240 V | $D = 1 - \dfrac{240 \sin\theta}{V_{out}}$ |
| 60 Hz | 120 V | $D = 1 - \dfrac{120 \sin\theta}{V_{out}}$ |
| 60 Hz | 277 V | $D = 1 - \dfrac{277 \sin\theta}{V_{out}}$ |

Thus, instead of continuously following and sampling the input voltage signal, as the conventional power factor correction controller does, the controller 505 only detects the zero crossing points and the peak voltage magnitude. The predictor 512 predicts the waveform of the input voltage according to the zero crossing points, the peak voltage, and the characteristics of the sine wave. The predictor 512 then outputs to the DSP 513 a set of equations corresponding to the waveform of the input voltage signal.

The DSP 513 also receives a voltage signal from point Y via an A/D converter 517 and a notch filter 516. The notch filter 516 removes harmonic ripples of the input voltage feeding into the loop. In this embodiment, the frequency of the input voltage is 60 Hz, and the notch filter 516 removes a narrow band of frequencies around 120 Hz, or twice the frequency of the input signal.

The DSP 516 further receives a current signal from point Z via an A/D converter 519 and a filter 518. The DSP 513 then calculates the duty and frequency of the boost switch according to the equations from the predictor 512, the voltage signal from point Y, and the current signal from point Z.

The main relations in the boost converters are as follows:

$$I_A = i\_ideal/(D1+D2) + v\_rail \cdot D1 \cdot Tsw/(2 \cdot L_b);$$

$$I_B = i\_ideal/(D1+D2) - v\_rail \cdot D1 \cdot Tsw/(2 \cdot L_b); \text{ and}$$

$$V_{out}/v\_rail = (D1+D2)/D2, \quad (1)$$

wherein $I_A$ refers to the maximum charging current;
$I_B$ refers to the minimum discharging current;
i_ideal refers to the current making the load 506 appear as a purely resistive load, and
can be calculated from the input voltage predicted by the predictor 512 and the impedance of the load 506;
D1 refers to the turn on time of the boost switch 503;
D2 refers to the turn on time of the boost diode 507;
v_rail refers to the rectified $V_{in}$, or the voltage at point X;
$T_{sw}$ refers to the period of the boost switch 503; and
$L_b$ refers to impedance of the boost inductor 504.

For continuous mode, D1+D2=1. Thus, $I_A$, $I_B$, D1 and D2 can be calculated from equation (1).

For discontinuous mode, $I_B$=0, and $D_{gap}$=1−D1−D2. Thus, $I_A$, D1 and D2 can be obtained from equation (1).

In one embodiment, the DSP 513 uses the following coefficient matrix to calculate a duty cycle of the boost switch 503:

$$A = [L_b, -L_b, -v\_rail(i) \cdot T_{sw}(k); L_b, -L_b, (v_o(i) - v\_rail(i)) \cdot T_{sw}(k); 1,1,0];$$

$$B = [0; (v_o(i) - v\_rail(i)) \cdot T_{sw}(k); 2 \cdot i\_ideal(i)];$$

$$X = A \backslash B, \quad (2)$$

wherein,
v_rail(i)=2+abs($V_m$*sin(wt(i)));
$V_m$=sqrt(2)*$V_{in\_low}$;
wt (i)=i*Del (k);
Del(k)=20*pi/Fsw(k);
Fsw(k)=1/Tsw(k);
Tsw(k)=[4*$L_b$/(effcy*$V_m$^2*D1_pk)*($P_{o\_rated}$−$P_{out}$(k))+1/Fsw_mx];
$v_o$(i)=$V_{out}$+($v_{o\_ripp}$/2)*sin(2*wt(i));
i_ideal (i)=0.1+abs($I_m$(k)*sin(wt(i)));
$P_{out}$(k)=kk*$P_o$_rated;
k=1:10
kk=(11−k)/10.
If x(2)>0, then
$I_A$(i)=x(1);
$I_B$(i)=x(2);
D1(i)=x(3); and
D2(i)=1−D1(i).

By solving the coefficient matrix (2), $I_A$, $I_B$, D1 and D2 can be obtained. If 0.2<D1(i)<1, D2(i)=1−D1(i). In this situation, the load is large, and the boost converter operates in continuous mode.

If 0<D1(i)≦0.2, then
$I_B$(i)=0;
$I_A$(i)=2*i_ideal (i);
D1(i)=$L_b$*($I_A$(i)−$I_B$(i))*$F_{sw}$(k)/v_rail(i); and
D2(i)=1−D1(i).

In this situation, the boost converter operates in critical mode.

If x(2)≦0, and (pi/6>wt(i)|wt(i)>5*pi/6), or x(2))≦0, and (pi/6<wt(i)<5*pi/6), then
$I_B$(i)=0;
D1(i)=0.5,
D2(i)=$L_b$*($I_A$(i)−$I_B$(i))*$F_{sw}$(k)/$v_o$(i)−v_rail(i)); and $D_{gap}$(i)=1−D1(i)−D2(i)

In this situation, the boost converter operates in discontinuous mode.

The DSP 513 calculates the charging current, the discharging current, the boost switch turn on time, and the boost diode turn on time according to the rectified input voltage, the output voltage, and the load behavior, and adjusts the duty cycle and frequency of the gate voltage $V_g$, of the boost switch 503 accordingly. The DSP 513 then sends the gate voltage via an D/A converter 514 and a driver 515. Consequently, the waveform of the input current is made to follow the waveform of the input voltage, even when the load is variable.

Figure 5B:
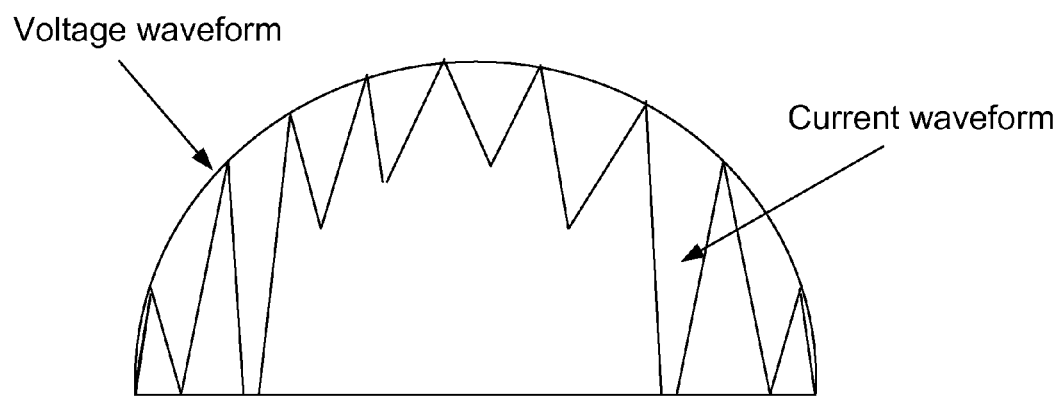
FIG. 5B illustrates the voltage waveform and current waveform of a multiple mode boost converter according to one embodiment of the present invention.

FIG. 5B illustrates the voltage waveform and current waveform of a multiple mode boost converter according to one embodiment of the present invention. As shown, the boost converter operates in continuous mode at the peak of the input voltage, in discontinuous mode at the beginning and end of the half input voltage cycle, and in critical mode during the transition of these two modes.

Figure 6A:
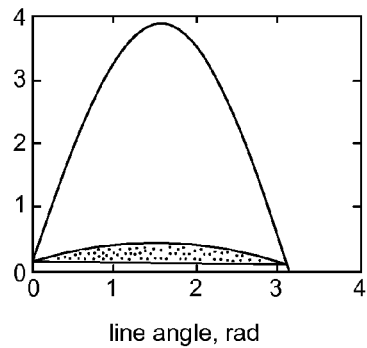
FIGS. 6A-D illustrate plots of variables of a boost converter employing a controller according to one embodiment of the present invention.
Figure 6B:
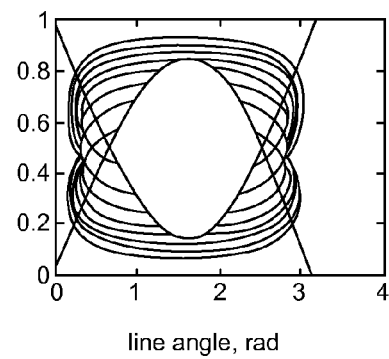
Figure 6C:
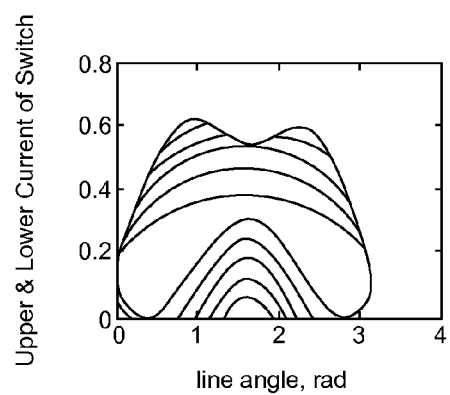
Figure 6D:
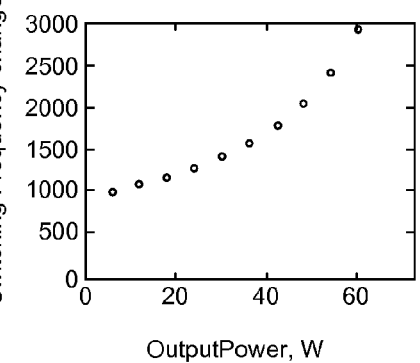
Figure 7A:
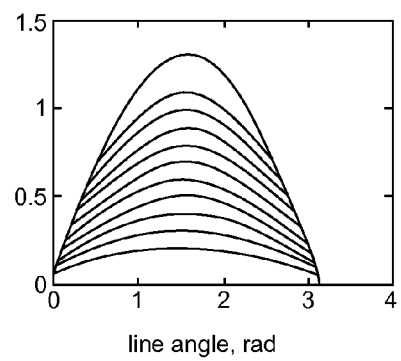
FIGS. 7A-D illustrate plots of variables of a boost converter employing a conventional controller.
Figure 7C:
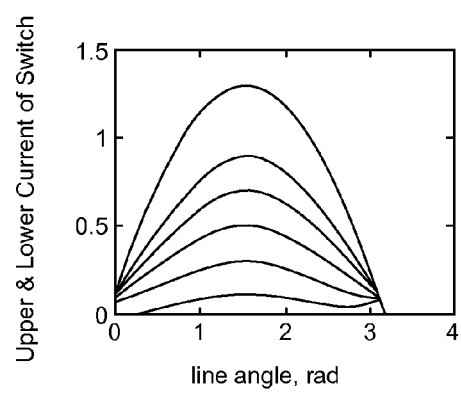
Figure 7B:
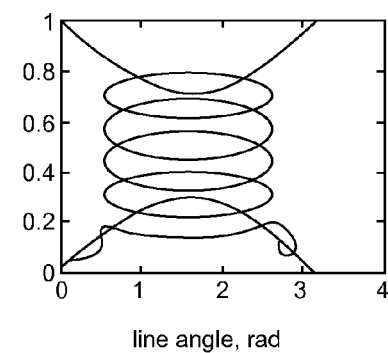
Figure 7D:
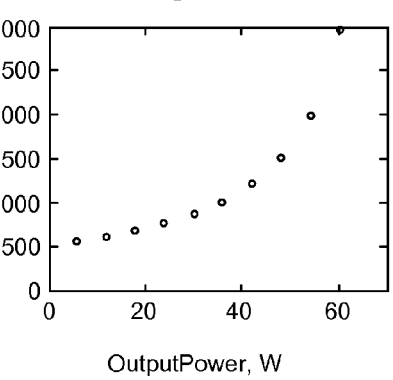

FIGS. 6A-D illustrate plots of variables of the multiple mode boost converter according to one embodiment of the present invention. FIGS. 6A-C indicate the change of rectified rail voltage, duty cycle, and upper and lower current of switch with respect to line angle in radian, and FIG. 6D indicates the change of switching frequency with respect to output power.

FIGS. 7A-D illustrate plots of variables of a conventional converter. Similarly, FIGS. 7A-C indicate the change of rectified rail voltage, duty cycle, and upper and lower current of switch with respect to line angle in radian, and FIG. 7D indicates the change of switching frequency with respect to output power.

Figure 8A:
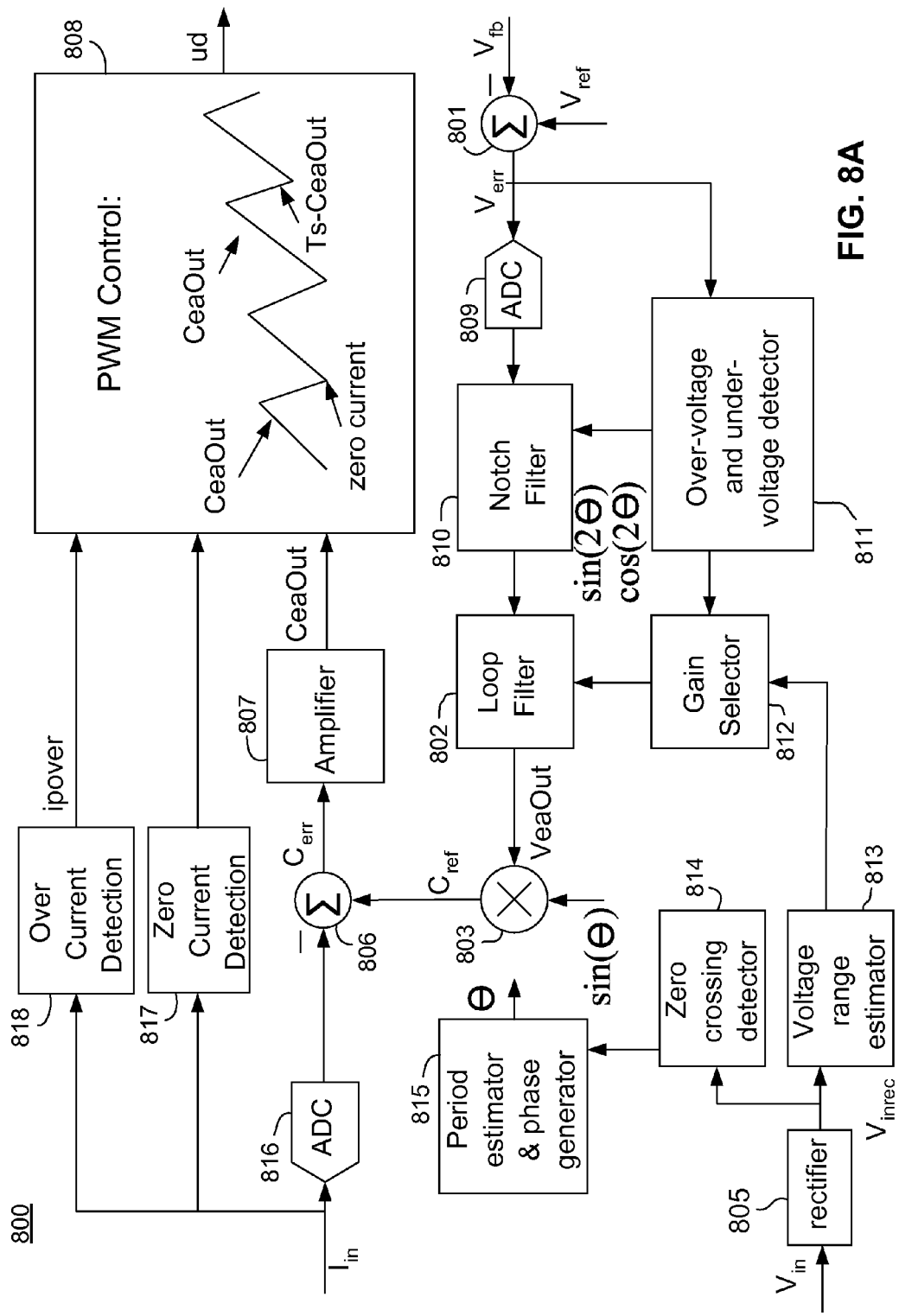
FIG. 8A shows a block diagram of a power factor correction controller for multiple mode operation according to another embodiment of the present invention.

FIG. 8A shows a block diagram of a multiple mode power factor correction controller according to another embodiment of the present invention. A controller 800 adjusts the operation mode of a boost converter according to the loading. When the loading is high, the controller 800 controls the boost converter to operate in the continuous mode. When the loading is low, the controller 800 changes the operation mode of the boost converter to the critical mode.

Figure 2A:
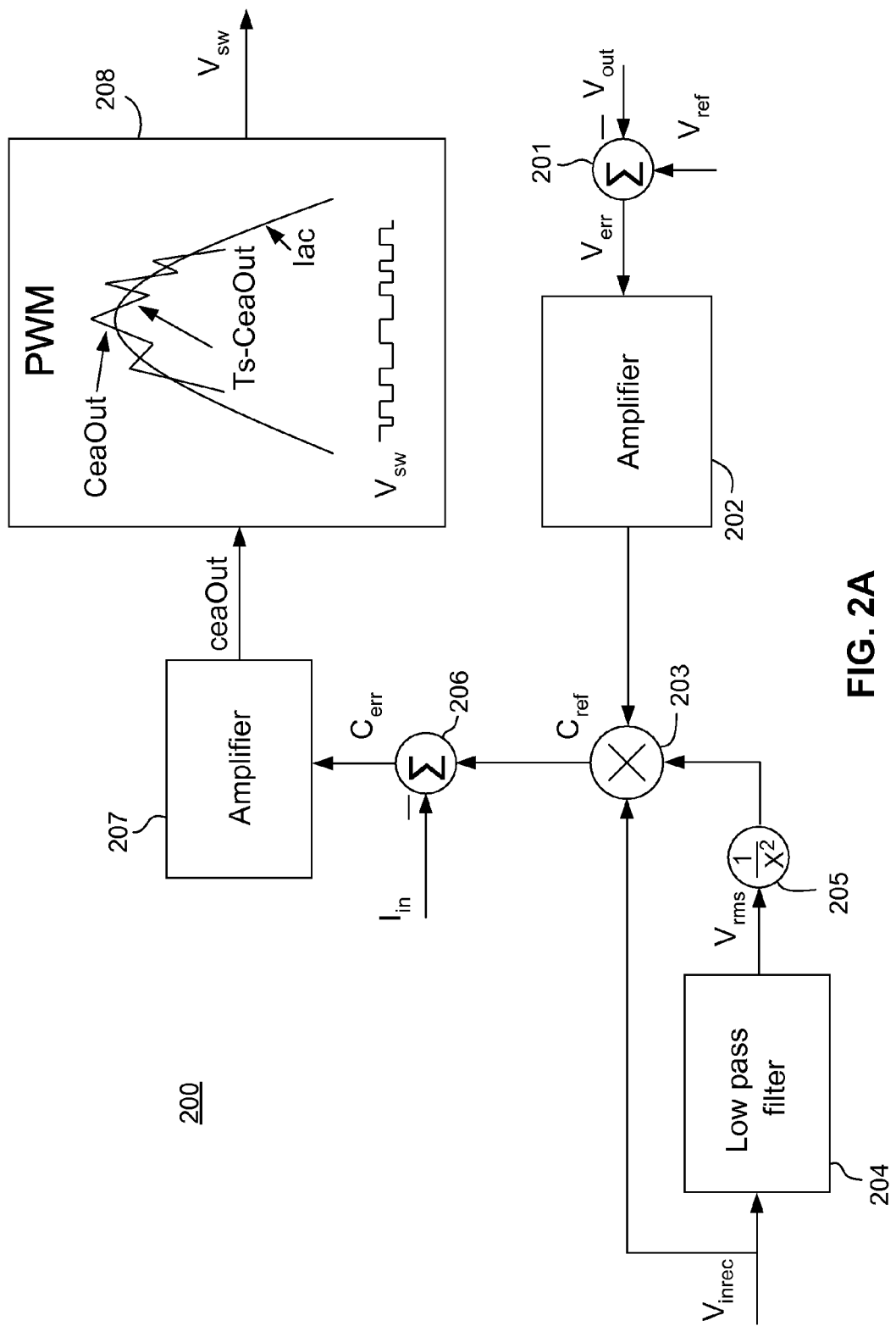
FIG. 2A shows a block diagram of a conventional power factor correction controller for continuous mode.
Figure 2B:
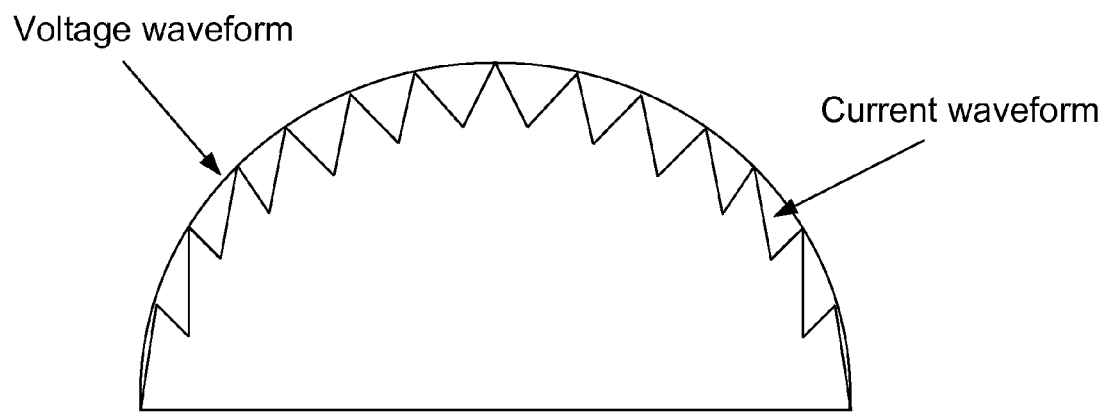
FIG. 2B illustrates the voltage waveform and current waveform of a conventional boost converter in continuous mode.
Figure 3A:
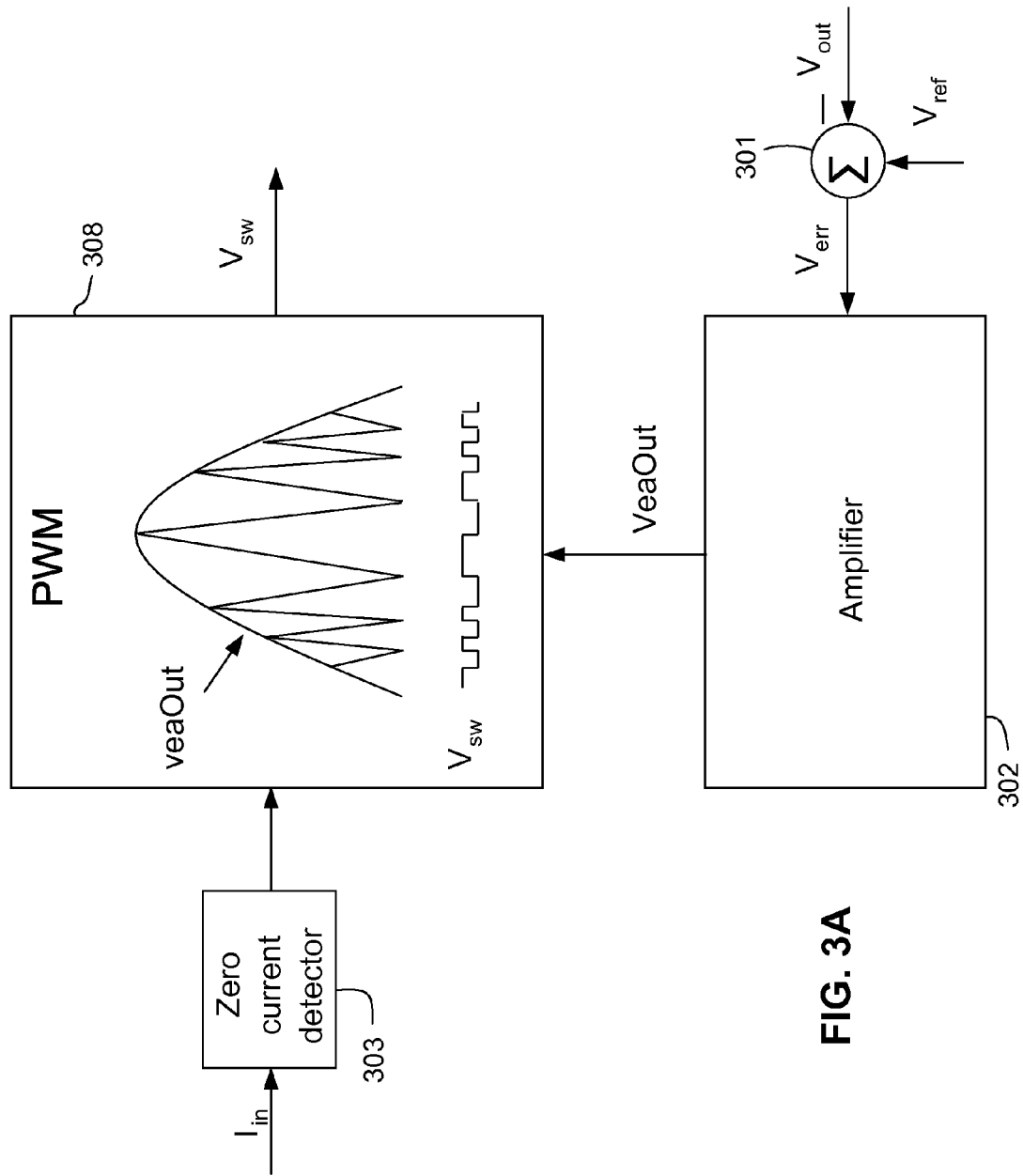
FIG. 3A shows a block diagram of a conventional power factor correction controller for critical mode.
Figure 3B:
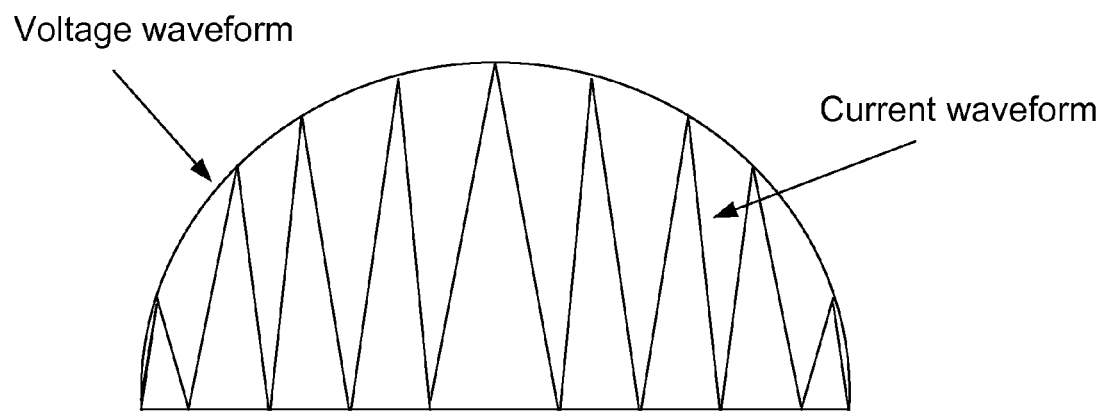
FIG. 3B illustrates the voltage waveform and current waveform of a conventional boost converter in critical mode.
Figure 4:
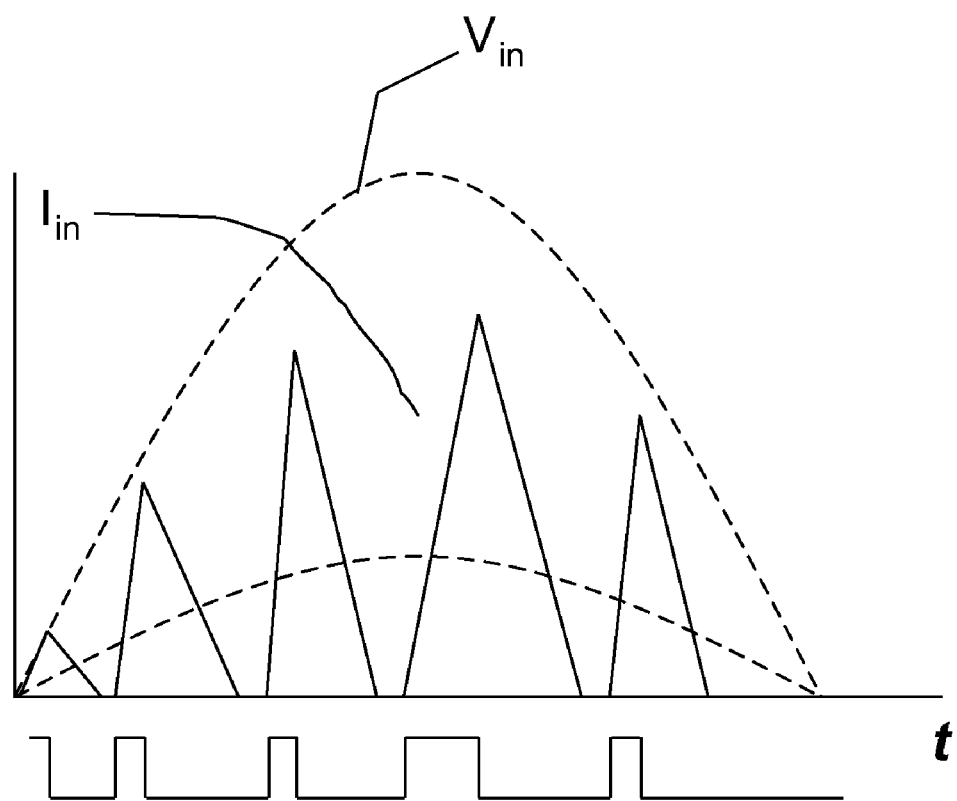
FIG. 4 illustrates the voltage waveform and current waveform of a conventional boost converter for discontinuous mode.

The controller 800 comprises most of the blocks of the controller 200 shown in FIG. 2A, including a subtractor 801, a multiplier 803, a subtractor 806, and a current amplifier 807. Similar reference numbers are used to indicate functionally similar blocks.

As shown, two A/D converters 809 and 816 convert analog signals for digital domain processing. A rectifier 805 rectifies the input voltage $V_{in}$. A zero crossing detector 814 determines the zero crossing points in the rectified input voltage $V_{inrec}$. A period estimator and phase generator 815 determines the period of the rectified input voltage $V_{inrec}$ and the phase θ of an instant point of $V_{inrec}$. A sine wave of θ is created and provided to the multiplier 803.

A sine wave and a cosine wave of integral times of θ are created and provided to a digital notch filter 810 so as to remove harmonic ripples in the output voltage $V_{out}$. In this embodiment, a sine wave and a cosine wave of 2θ are provided to the notch filter 810. A voltage range estimator 813 provides the voltage range of the rectified input voltage $V_{inrec}$ to a gain selector 812. A detector 811 detects over-voltage and under-voltage in the voltage error $V_{err}$ and provides such information to the gain selector 812. The gain selector 812 then determines the gain of a loop filter 802, which is also a voltage amplifier, to provide over-voltage protection.

The voltage error $V_{err}$ from the subtractor 801 is sampled by the A/D converter 809, filtered by the notch filter 810, and amplified by the loop filter 802 according to the gain from the gain selector 812. The phase θ, its sine wave, and the amplified $V_{err}$ ($V_{eaout}$) are multiplied to generate a factor $C_{ref}$. A subtractor 806 subtracts the factor $C_{ref}$ from the sampled input current $I_{in}$, obtaining a current error $C_{err}$. The current amplifier 807 provides $C_{eaout}$, amplified current error $C_{err}$, to a PWM controller 808. The PWM controller 808 then generates a voltage pulse to control the switch 103 shown in FIG. 1 according to signals from the current amplifier 807, a zero current detector 817 and an over current detector 818. When the current exceeds the over current limit, the over current detector 818 opens the switch.

The multiple mode controller shown in FIG. 8A combines the average current mode and the critical mode. The charge time of the multiple mode controller is the same as that of the average current mode. The normal period for charging and discharging the boost inductor 104 in mixed mode, $T_s$, is also the same as that of the average current mode. The controller 800 adjusts the operating mode by controlling the start of the recharging. When a zero current is detected before $T_s$ expires, the controller 800 changes the operating mode to critical mode by closing the boost switch 103 to start recharging of the boost inductor. Otherwise, the boost converter continues to operate in the average current mode by starting recharging of the boost inductor after $T_s$ expires.

Figure 8B:
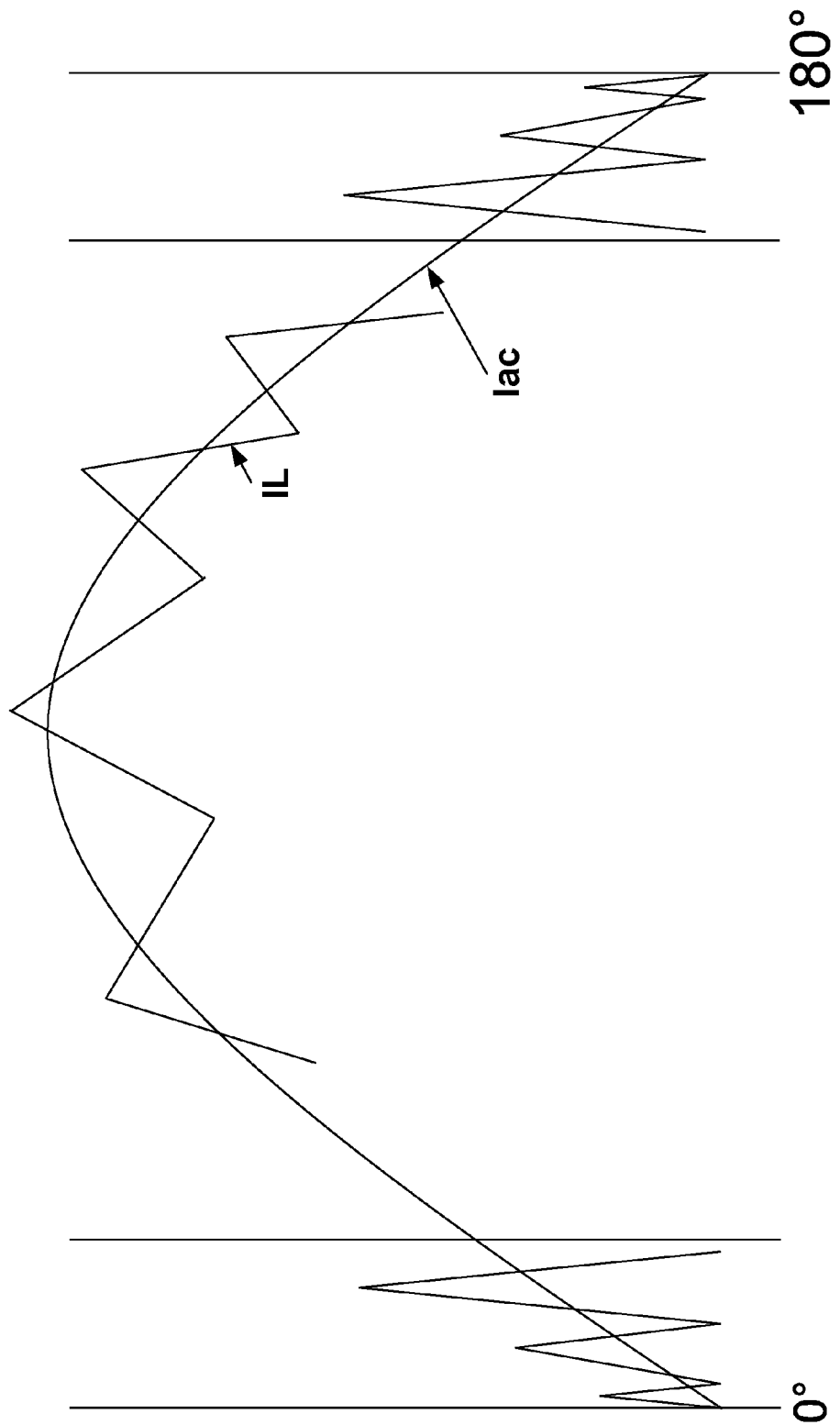
FIG. 8B illustrates the voltage waveform and current waveform of a boost converter employing the multiple mode controller shown in FIG. 8A.

FIG. 8B illustrates the voltage waveform and current waveform of a boost converter employing the multiple mode controller shown in FIG. 8A. As shown, when the phase of the input voltage is close to 0° or 180°, the loading is relatively low, the boost converter operates in critical mode. When the phase of the input voltage is close to 90°, the loading is relatively high, the boost converter operates in average current mode.

Figure 9:
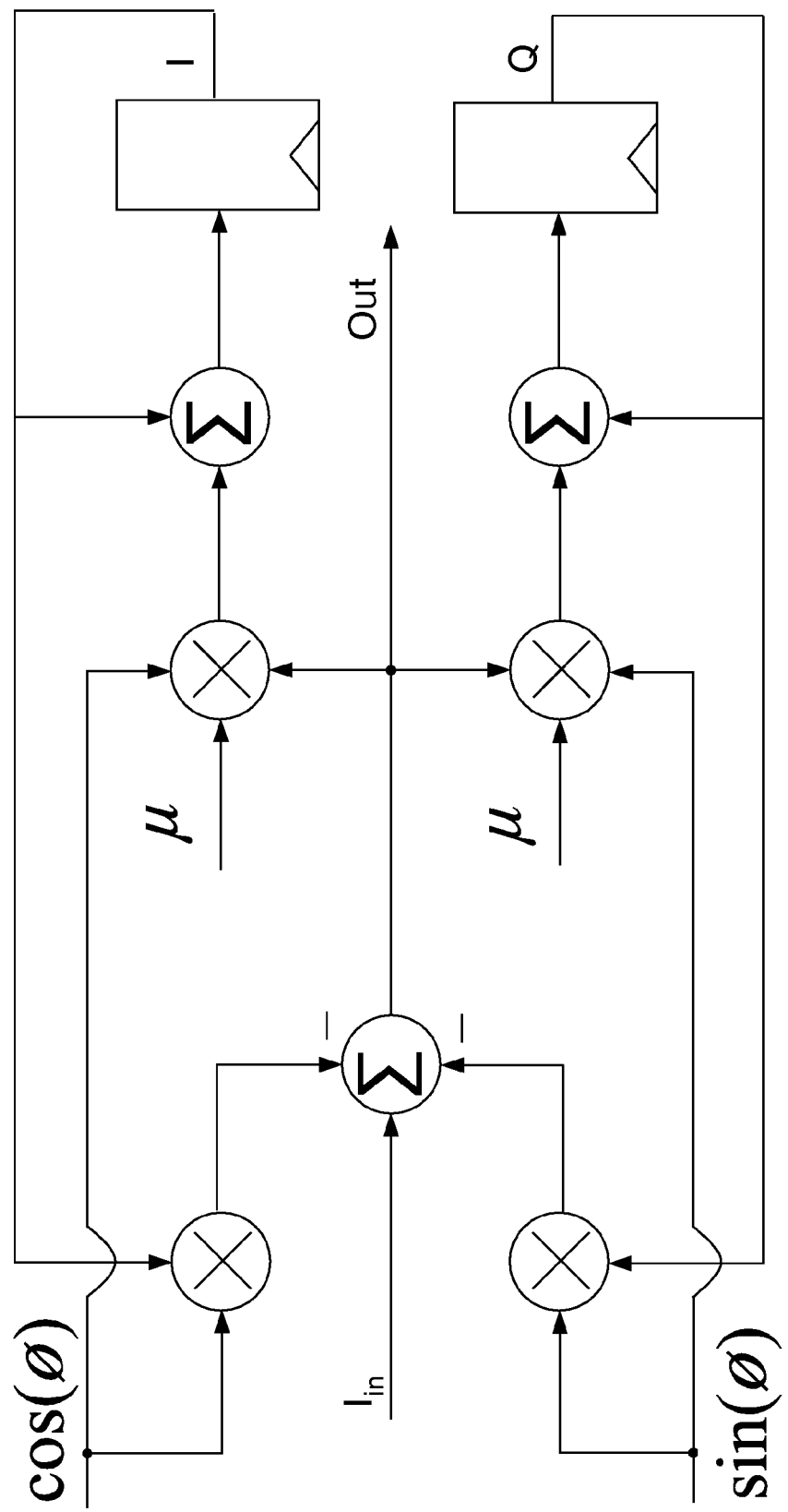
FIG. 9 shows a block diagram of a single-tone notch filter according to one embodiment of the present invention.

The notch filter 810 could be single tone or multi-tone. FIG. 9 shows a block diagram of a single-tone notch filter according to one embodiment of the present invention, wherein Φ is the phase of the second harmonic of the rectified input voltage $V_{inrec}$, and μ represents bandwidth selection or step size of the adapter. The notch filter removes the harmonic ripples by operations to the sine wave and cosine wave of the phase of the harmonic. When the frequency of the input is 60 Hz, the digital notch filter can be configured to remove harmonic ripples of 120 Hz, 180 Hz and so on.

According to one embodiment of the invention, the overcurrent protection described above with reference to the controllers of FIG. 5 or FIG. 8A may be adaptive. In this embodiment, the current limit feature may detect the input voltage level (for any range of inputs), and may select the overcurrent threshold accordingly for an almost constant power level. In one aspect, a soft start scheme may be provided during start up to aid in preventing over current, without requiring a specific current limit scheme during start up.

This adaptive feature self adjusts a gate driver current source and slew rate based on the gate input capacitor of the boost transistor or boost switch (which may be a MOSFET). To avoid harmful over charge of the gate capacitor, calibration of the PWM pulse in the PWM controller 808 of FIG. 8A may be synchronized with the end of the soft start and the zero crossing of the line cycle. Providing an adaptive slew rate of the gate PWM also can reduce an electromagnetic interference (EMI) effect of the switching current spikes and can increase system efficiency.

In one embodiment, the adaptive over current (current limit) protection works by detecting the voltage level of the universal input voltage and self adjusting the overcurrent reference level to provide an almost constant power. An input voltage monitor may provide multi-level overcurrent protection. The function also serves to differentiate between an 110Vrms input voltage and a 220Vrms input voltage system. For example, to achieve a constant power limitation, in a 220Vrms system the over current threshold should be almost half that of the 110Vrms system. A single comparator with multi-level adjustable references may be used to detect an input voltage level and adjust the over current protection (OCP) accordingly.

For a higher level of input voltage detection, the over current threshold may be stepped down to lower the current limit level. At start up, the current limitation may be fixed on the lowest level related to the low input voltage (e.g. 108Vrms).

A sequence of normal regulation and adaptive driver gate charge evaluation, or GCE, now will be described.

After $V_o > 87.5\% V_{o-rated}$, normal regulation should start. For the first power-on after each reset, an adaptive driver block will perform a GCE process for a short period in the neighborhood of the line voltage zero crossing, and will determine a number of pre-driver arrays required for a given power MOSFET. To activate GCE, three conditions should be present:

1) $V_{FB} > 87.5\%$ rated

2) Signal Clk 21=1

3) Signal "Evaldone"=0

Once the GCE takes place the "Evaldone" signal remains high, and GCE will not repeat except after reset. When "Evaldone"=1, normal regulation starts and operation continues based on the selected normal mode operation, Average Current (or continuous) Mode or Mixed Mode. If at any time during operation, overvoltage or overcurrent protection or any other fault condition occurs, as shown in the state diagram of FIG. 10, the operation will roll back to an appropriate state.

Figure 10:
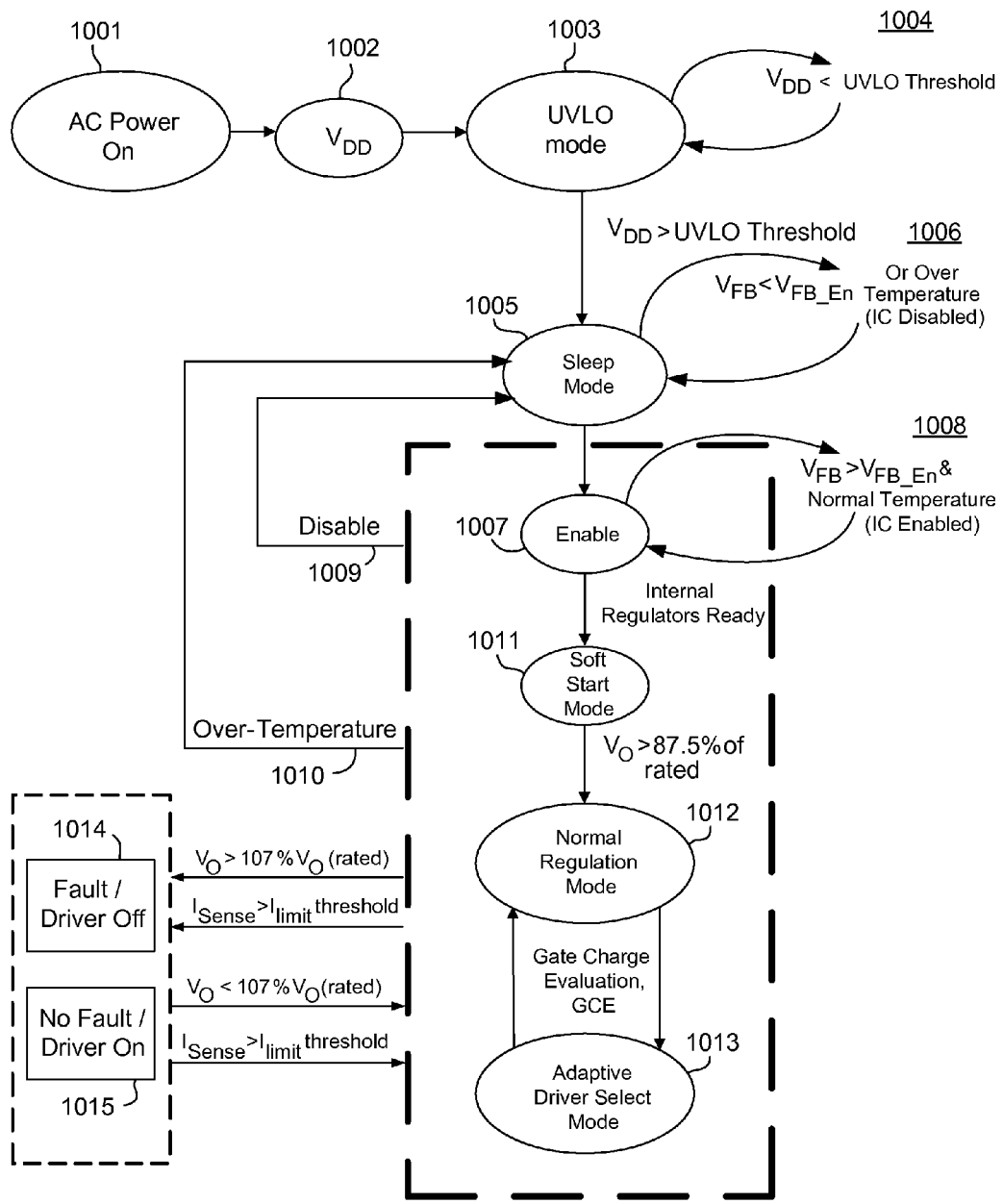
FIG. 10 is a state diagram depicting a sequence of power-on and normal operation according to one embodiment of the present invention.

Looking now at FIG. 10, AC power on occurs at 1001. Vdd is monitored at 1002. Comparison of Vdd to an undervoltage lockout (UVLO) threshold occurs at 1003 and 1004. So long as Vdd is below that threshold, the system remains in UVLO mode.

After Vdd exceeds the UVLO threshold, at 1005 the system enters a sleep mode, an intermediate state in which some functions are active but other functions are turned off. Sleep mode comes after Vdd12>8V when the UVLO signal is pulled low. In this low consumption mode, the low power bandgap, shunt regulator, UVLO, and over temperature detection circuits are active. This mode will persist until the Enable signal "En" goes high, at which point the system goes to 1007 in FIG. 10. Vo>10% gives En=1 and Vo<8% gives En=0.

The Enable state will persist according to 1008. From any other mode in which the "En" signal is pulled low, or the over temperature fault signal goes high (Tov=1), the state machine rolls back to the low consumption sleep mode, per 1009 and 1010.

A soft start mode begins at 1011. At every start up the PFC load is seen as a short circuit because of the output capacitor's low impedance. The soft start mode controls a slew rate of output voltage buildup in a controlled manner. At beginning of this mode that oscillator, ADC, DSP core and one branch of pre-drivers are active for some fixed number of gating pulses of a minimum duty cycle (D≈6%) to start the switching. This arbitrary switching helps to avoid the zero crossing distortion of the input voltage divider because of a rectifier parasitic effect that could disturb zero crossing detection and the start up process (specifically in high input voltage situations, for example, Vin>250Vrms). Soon after the internal signal confirms that the input is present then the soft start mode continues until the output voltage FB is above 87.5% of the rated value ($V_o > 87.5\% V_{o-rated}$). At this point, the system enters normal regulation mode at 1012, and GCE is performed at 1013 according to conditions described above. Thereafter, operation continues at 1012 based on the selected mode of operation.

During the boost output voltage ramp up, to enable smooth charging of the output capacitor and to fulfill the requirements of the load type (e.g.; flyback or LED driver applications of the IC), a selectable multi level soft start mode may be activated by codes. When the output voltage exceeds the Standby threshold (>10% of rated output), the soft start mode may be activated until the voltage reaches about 87.5% Vo-rated (equivalent to the scaled down Feed Back voltage of 2.5*87.5%=2.18 V at IC pin "FB"). In one embodiment, the soft start mode can be controlled by registers, for example, in a DSP such as DSP 513 in FIG. 5. The slope of start up may be controlled by the user with a predefined external resistor connected to ground.

If, during normal operation, the output voltage for any reason drops below 10% of rated output, the state machine switches back to the Standby state and Soft Start Mode would repeat again. During the soft start, regardless of the input voltage range detection, the lowest threshold of the current limitation related to the minimum input voltage is selected.

In addition, in an overvoltage or overcurrent condition (for example, Vo>107% of the rated voltage, or any other desired threshold setting, as may be detected by overvoltage detector 811 in FIG. 8A) or Isense>Ilimit, the limiting current threshold which also may be set as desired, and as may be detected for example by overcurrent detector 818 in FIG. 8A), a fault may be triggered, as at 1014 in FIG. 10, and the driver of the boost switch turned off. When the overvoltage and/or overcurrent conditions end, the fault condition may end and the driver of the boost switch may be turned on again, as at 1015.

The method and apparatus of the present invention can be used in any power supply. While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A boost converter for power factor correction, comprising:
    a boost inductor;
    a boost switch, closed for charging the boost inductor and opened for discharging the boost inductor; and
    a controller for controlling the boost switch to dynamically change an operation mode of the boost converter to transition between two modes among continuous mode, critical mode and discontinuous mode;
    wherein the controller responds to voltage and temperature conditions at startup to control the boost switch once an input voltage reaches a first predetermined level.

2. The boost converter according to claim 1, wherein the controller enters an undervoltage lockout mode before the input voltage reaches a second predetermined level.

3. The boost converter according to claim 2, wherein the controller enters a sleep mode once said input voltage reaches said second predetermined level, but before said input voltage reaches a third predetermined level.

4. The boost converter according to claim 3, wherein the controller returns to said sleep mode in response to an overtemperature condition.

5. The boost converter according to claim 2, wherein said second predetermined level is lower than said first predetermined level.

6. The boost converter according to claim 1, wherein said first predetermined level is adaptively controlled.

7. The boost converter according to claim 6, wherein an overcurrent condition of said boost converter is controlled by setting said first predetermined level so that a power level of said boost converter is substantially constant.

8. A method for controlling a boost converter for power factor correction, the boost converter comprising a boost inductor, a boost switch, and a controller, the method comprising:
    dynamically changing operation mode of the boost converter to transition between two modes among continuous mode, critical mode and discontinuous mode; and
    responsive to voltage and temperature conditions at startup, controlling the boost switch once an input voltage reaches a first predetermined level.

9. The method according to claim 8, further comprising entering an undervoltage lockout mode before the input voltage reaches a second predetermined level.

10. The method according to claim 9, further comprising entering a sleep mode once said input voltage reaches said second predetermined level, but before said input voltage reaches a third predetermined level.

11. The method according to claim 10, further comprising returning the controller to said sleep mode in response to an overtemperature condition.

12. The method according to claim 9, wherein said second predetermined level is lower than said first predetermined level.

13. The method according to claim 8, further comprising adaptively controlling said first predetermined level.

14. The method according to claim 13, further comprising controlling an overcurrent condition of said boost converter by setting said first predetermined level so that a power level of said boost converter is substantially constant.

15. A controller for controlling a boost switch of a power factor correction boost converter, said controller comprising:
    a processor communicating with the boost switch, and responsive to an input voltage and an output voltage of the power factor correction boost converter to calculate a turn on and turn off time of the boost switch to dynamically change operation mode of the power factor correction boost converter to transition between two modes among continuous mode, critical mode and discontinuous mode;
    wherein the controller responds to voltage and temperature conditions at startup to control the boost switch once an input voltage reaches a first predetermined level.

16. The controller according to claim 15, wherein the controller enters an undervoltage lockout mode before the input voltage reaches a second predetermined level.

17. The controller according to claim 16, wherein the controller enters a sleep mode once said input voltage reaches said second predetermined level, but before said input voltage reaches a third predetermined level.

18. The controller according to claim 17, wherein the controller returns to said sleep mode in response to an overtemperature condition.

19. The controller according to claim 16, wherein said second predetermined level is lower than said first predetermined level.

20. The controller according to claim 15, wherein said first predetermined level is adaptively controlled.

21. The controller according to claim 20, wherein an overcurrent condition of said boost converter is controlled by setting said first predetermined level so that a power level of said boost converter is substantially constant.

22. A boost converter for power factor correction, comprising:
   boost inductor means;
   boost switch means, closed for charging the boost inductor and opened for discharging the boost inductor; and
   controller means for controlling the boost switch to dynamically change an operation mode of the boost converter to transition between two modes among continuous mode, critical mode and discontinuous mode;
   wherein the controller responds to voltage and temperature conditions at startup to control the boost switch means once an input voltage reaches a first predetermined level.

23. A controller for controlling a boost switch of a power factor correction boost converter, said controller comprising:
   processor means communicating with the boost switch, and responsive to an input voltage and an output voltage of the power factor correction boost converter to calculate a turn on and turn off time of the boost switch to dynamically change operation mode of the power factor correction boost converter to transition between two modes among continuous mode, critical mode and discontinuous mode;
   wherein the controller responds to voltage and temperature conditions at startup to control the boost switch once an input voltage reaches a first predetermined level.

\* \* \* \* \*